United States Patent [19]

Sabloewski

[11] Patent Number: 5,012,682

[45] Date of Patent: May 7, 1991

[54] PIPETTING DEVICE

[75] Inventor: Horst Sabloewski, Hamburg, Fed. Rep. of Germany

[73] Assignee: Firma Eppendorf-Netheler-Hinz GmbH, Hamburg, Fed. Rep. of Germany

[21] Appl. No.: 425,791

[22] Filed: Oct. 23, 1989

[30] Foreign Application Priority Data

Oct. 21, 1988 [EP] European Pat. Off. ........... 88117553

[51] Int. Cl.⁵ ........................... G01N 1/14; B01L 3/02

[52] U.S. Cl. ................................................. 73/864.18

[58] Field of Search ........... 73/864.16, 864.17, 864.18, 73/864.14, 864.15, 864.13, 864.11, 864.12; 422/100

[56] References Cited

U.S. PATENT DOCUMENTS

| | | | |
|---|---|---|---|
| Re. 30,453 | 12/1980 | Scordato et al. | 73/864.14 |
| 2,946,486 | 7/1960 | Gilmont | 73/864.16 X |
| 3,613,952 | 10/1971 | Gilmont et al. | 73/864.18 X |
| 3,646,817 | 3/1972 | Hinchman et al. | 73/864.18 X |
| 3,766,785 | 10/1973 | Smernoff | 73/864.14 |
| 3,827,305 | 8/1974 | Gilson et al. | 73/864.18 |
| 3,855,868 | 12/1974 | Sudvaniemi | 73/864.18 X |
| 3,882,729 | 5/1975 | Roach | 73/864.18 |
| 3,918,308 | 11/1975 | Reed | 73/864.14 |
| 4,041,764 | 8/1977 | Sabloewski et al. | 73/864.18 X |
| 4,096,750 | 6/1978 | Sturm | 73/864.18 |
| 4,098,125 | 7/1978 | Lee | 73/864.18 X |
| 4,141,251 | 2/1979 | Oshikubo | 73/864.18 |
| 4,165,646 | 8/1979 | Shapiro | 73/864.18 X |
| 4,567,780 | 2/1986 | Oppenlander et al. | 73/864.16 |
| 4,690,005 | 9/1987 | Tervamäki et al. | 73/864.17 X |

FOREIGN PATENT DOCUMENTS

| | | | |
|---|---|---|---|
| 41318 | 12/1981 | European Pat. Off. | 73/864.16 |
| 0112887 | 2/1986 | European Pat. Off. . | |
| 181957 | 5/1986 | European Pat. Off. . | |
| 2549477 | 5/1977 | Fed. Rep. of Germany . | |
| 2709583 | 9/1977 | Fed. Rep. of Germany | 73/864.16 |
| 2808649 | 10/1978 | Fed. Rep. of Germany . | |
| 2921442 | 12/1979 | Fed. Rep. of Germany . | |
| 3137423 | 3/1983 | Fed. Rep. of Germany . | |
| 2330456 | 6/1977 | France . | |
| 2022453 | 12/1979 | United Kingdom . | |

*Primary Examiner*—Tom Noland
*Attorney, Agent, or Firm*—Toren, McGeady & Associates

[57] ABSTRACT

A pipetting device is provided at its top with an actuating element, which is depressible against spring action and which is connected to a piston, which is movable in a cylinder to move an air volume. The cylinder communicates with an opening in a particularly conical pipette connector, on which a pipette tip which open-topped and open-bottomed is adapted to be slidably fitted. The pipettable volume is adapted to be adjusted by a rotation of the actuating element. The actuating element consists of a knob, which is axially movable to establish and separate a detent element joint between a screw and a nut which is fixed in the housing. By a rotation of the actuating knob the screw can be rotated in said nut to impart an axial movement to a piston rod, which is connected to the piston so that the latter is infinitely adjustable in known manner. At least one of the detent elements which constitute the detent element joint comprises teeth which are spaced around the center line of the pipetting device. The detent element joint preferably comprises two meshing gears, which are non-rotatably connected to the actuating element and to the housing, respectively.

19 Claims, 10 Drawing Sheets

5
41
39
6
4
1
45
3'
44
3
42
43
58
57
55
56

PIPETTING DEVICE

BACKGROUND OF THE INVENTION

1. Field of the Invention

This invention relates to a pipetting device comprising a housing, from the top end of which an actuating element protrudes, which is adapted to be depressed against spring action and is connected to a piston that is movable in a cylinder to move an air volume, which cylinder communicates with an opening of a tubular pipette connector, particularly a connector cone, for connecting the cylinder to an open-topped and open-bottomed pipette tip, wherein the actuating element is adapted to be rotated to adjust the pipettable volume.

2. Description of the Prior Art

Such pipetting devices are known. The invention is particularly based on a pipetting device which is disclosed in U.S. Pat. No. 4,041,764, the disclosure of which is incoporated herein by reference. That known device comprises special retaining means, which may consist of magnetic retaining means. That known device comprises in its lower portion a piston rod, which is movable within a cylinder for moving an air volume relative to the open bottom end of the housing in which the cylinder is terminated. By that movement of an air volume a liquid sample can be sucked into or dispensed from the pipette without contacting the piston In that known design an adjustment of the pipettable volume is permitted by the provision of camlike stops, which are spaced around the periphery of the actuating element on different levels. By means of mechanical detent means provided on the actuating element, which may consist of an actuating knob, said stops may be adjusted to engage an abutment in order to set the device for a selected pipettable volume.

The known design may also comprise springs for holding cooperating parts together if magnetic means for that purpose are not provided.

In that known design the pipettable volume can be adjusted only in steps.

It is also known, e.g., from German Patent Publication No. 28 08 649 based on U.S. Pat. application Ser. No. 783,051 filed on Mar. 30, 1977 and now U.S. Pat. No. 4,098,125, to permit an infinite adjustment in that the piston rod extends in a tube, which is provided with external screw threads, on which a sleeve is screwed, which can be reciprocated in that the sleeve and the tube are rotated relative to each other so that the piston can also infinitely be adjusted. In that case a fixing must not be loosened before and tightened after each adjustment. For this reason that device is expensive and great care is required in its operation.

An adjustable pipette is known, which also comprises a screwable sleeve, which is coupled to a piston rod by a disklike enlarged portion provided at the bottom end of said piston rod and held in coupling engagement with the sleeve by spring action.

That known pipette is not reliable in operation, particularly because longitudinal grooves formed in the outside surface of the sleeve cooperate with a closing tip, which is urged against the sleeve by a leaf spring. As a result, a snap-action joint is provided, which does not permit a fine adjustment which generates a noise during an adjustment.

European Pat. No. 112,887 discloses a volume-controllable pipette, which has a detent mechanism, which has ball-shaped projections, which cooperate with corresponding recesses formed in a different element so that the volume can be adjusted. That device also permits an adjustment only in coarse steps, the adjustment results in a generation of noise and a fine adjustment is not permitted.

A known microliter pipette comprises a brake by which a volume setting can be fixed. But such brake can be overcome and it hinders the adjustment and in case of an insufficient pressure applied will not reliably fix the setting.

Those known devices which permit of a fine adjustment have the disadvantage that the volume setting cannot reliably be fixed. There is also a risk that an adjustment may involve an "overturning" of the parts so that parts may be damaged.

SUMMARY OF THE INVENTION

It is an object of the invention to provide a pipetting device which is of the kind described first hereinbefore and which permits a fine adjustment but in which a reliable adjustment and an easy and yet reliable operation are ensured.

That object is accomplished in that the actuating element comprises a knob and is adapted to disengage a vertically separable detent element joint provided between a screw and a nut which is fixed in the housing and the piston can substantially infinitely be adjusted in known manner in that the actuating knob is rotated to rotate the screw, which is connected to the piston by a piston rod.

It is essential that the detent element joint can be disengaged to permit of an infinite adjustment. That disengagement is effected by an axial lifting movement, which is effected by the actuating knob, which can be rotated for a peripheral adjustment also when it has been lifted. The actuating knob is thus used to separate the joint and to permit the adjustment.

The detent element joint which can be separated and the possibility of a substantially infinite adjustment permit the provision of a particularly desirable pipetting device, in which desired adjustment can be chosen and which can be fixed in the chosen setting. The detent element joint permits of a fixation in positions which are very closely spaced apart.

At least one of the members which constitute the detent element joint preferably comprises teeth which are spaced around the center line of the pipetting device.

That peripheral spacing permits of any desired peripheral adjustment. In a desirable embodiment, the teeth of both gears which constitute the detent element joint are peripharally spaced apart with a small pitch so that a particularly fine adjustment can be effected by an interengagement with radial symmetry. In accordance with the statements made hereinbefore that radially symmetrical interengagement may be eliminated by an axial movement in one direction and re-established by an axial movement in the opposite direction.

The detent element joint is desirably constituted by two gears, which are provided on parts of the pipetting device which are movable relative to each other. The use of such gears will afford the advantage that gears having a very fine pitch can be manufactured in a relatively simple manner. In a preferred embodiment a direct volume adjustment can be effected in that the gears which constitute the detent element joint have a pitch which permits a peripheral adjustment in extremely small steps. A relative rotation by one tooth pitch will then result in the smallest possible volume change.

A very fine adjustment will be permitted if the detent elements consist of gears having bladelike teeth.

In another desirable embodiment the tooth spaces of the gears have a depth of about 1.5 mm to ensure a reliable meshing of the gears and to permit the use of gears having a very small pitch.

The provision of a detent element joint which is constituted by gears will result in a combination of an infinitely ajdustable screw drive and of two meshing gears.

The meshing gears preferably have axially engageable and disengageable teeth because one gear has upwardly extending teeth and a gear provided on the actuating knob has teeth which can be inserted from above into the first mentioned gear in a preferred embodiment.

In another desirable embodiment, a gear having radial teeth is axially movable into and out of meshing engagement with radial teeth of a gear which is fixed to the housing.

It is apparent that the gears which constitute the detent element joint may axially or radially mesh with each other. In both cases, the joint can be separated in that one gear is lifted out of the other in the axial direction of the pipetting device.

In accordance with a further, particularly preferred feature, a friction coupling or a torque-limiting coupling is provided between the actuating knob and the screw permits of a rotation of the actuating knob while the gears are in mesh. That arrangement will prevent an exertion of strong forces on the fine-pitch gears so that they will not be destroyed by an arbitrary rotation of the actuating knob when the gears are in mesh.

In the detent element joint which can axially be separated the axially disengageable detent elements may consist of gears having elastic teeth, which permit the gears to rotate relative to each other even when the gears are in mesh.

That feature may be adopted with gears which mesh in an axial direction or in a radial direction. In that case the teeth desirably consist of flexible blades formed at their ends with enlarged portions, which interengage to oppose a separation of the joint.

The provision of interengaging enlarged portions on the teeth of both gears will ensure a reliable mesh, particularly if the enlarged portions are staggered or forwardly and rearwardly offset from each other in a preferred embodiment. In that case the gears may be caused to mesh with each other in that teeth which are slidable to interengage with each other are symmetrically moved toward each other so that an enlarged portion of a tooth of one gear will first yield and that enlarged portion will subsequently perform a reverse movement and the gears will then positively interlock as other enlarged portions of bladelike teeth interengage.

The enlarged portions desirably consist of spherical beads.

In another desirable embodiment the enlarged portions are spherical and the enlarged portions of the two gears taper in mutually opposite directions. An interengagement can also be effected in that case if the enlarged portions are provided on elastic blade-like teeth.

In a desirable embodiment, a piston rod is connected to the piston and extends between the piston and the top end of the adtuating knob and is provided with a stop, which is engageable with the screw to define an uppermost position for the piston rod relative to the screw and in the actuating knob. Damage to that stop when it is engaged by the piston rod will also be prevented by the friction or torque-limiting coupling.

In another desirable embodiment a friction or torque-limiting coupling is provided between the actuating knob and a knob carrier which carries the actuating knob, and is provided with one of the gears of the detent element joint and said coupling comprises interengaging peripherally spaced apart elements and specifically comprises an elastic coupling member which is formed with peripherally spaced apart recesses and another coupling member, which is formed with elastic detent elements extending into said recesses, one of said coupling members is provided on the knob carrier, which carries one of the gears of the detent element joint, and the other coupling member is provided on the rotatably mounted actuating knob.

That embodiment is particularly simple and permits the actuating knob to be rotated by a relatively small force owing to the special design of the torque-limiting coupling.

In a particularly desirable embodiment the knob carrier is non-rotatably and axially slidably mounted in the housing and is provided with axially extending, tongue like spring elements, which are adapted to extend into a selected one of axially apart annular grooves of the piston rod in dependence on the axial position of the actuating knob. In that case the operator can actually detect the position to which the actuating knob is moved.

The actuating knob suitably consists of two parts, which are non-rotatably connected to each other, the top portion of the upstanding piston rod extends into an elastic insert of the actuating knob, and said insert has outwardly spreadable spring elements, which engage the underside of abutments formed on the knob carrier.

In another preferred embodiment the torque-limiting coupling consists of grooves formed in an upwardly protruding cylindrical extension of a knob connector and inwardly directed ribs provided on depending shell of the cover cap of the actuating knob.

In a preferred embodiment the gears which constitute the detent element joint have bladelike teeth, which are laterally yieldable.

In that case, enlarged portions are formed only on the teeth of one of the gears which constitute the detent element joint. In a desirable embodiment the teeth of the other gear are formed with recesses for receiving said enlarged portions.

In another particularly desirable embodiment the pitch circles of the two gears have different radii and their teeth are elastically yieldable, particularly also in a radial direction, and formed with overlapping beads.

BRIEF DESCRIPTION OF THE DRAWING

FIG. 1 consists of FIGS. 1*a* and 1*b*, which are to be arranged one under the other, and is a vertical longitudinal sectional view showing the upper portion of a pipetting device which embodies the invention.

DETAILED DESCRIPTION OF THE PREFERRED EMBODIMENTS

Figure 1A:
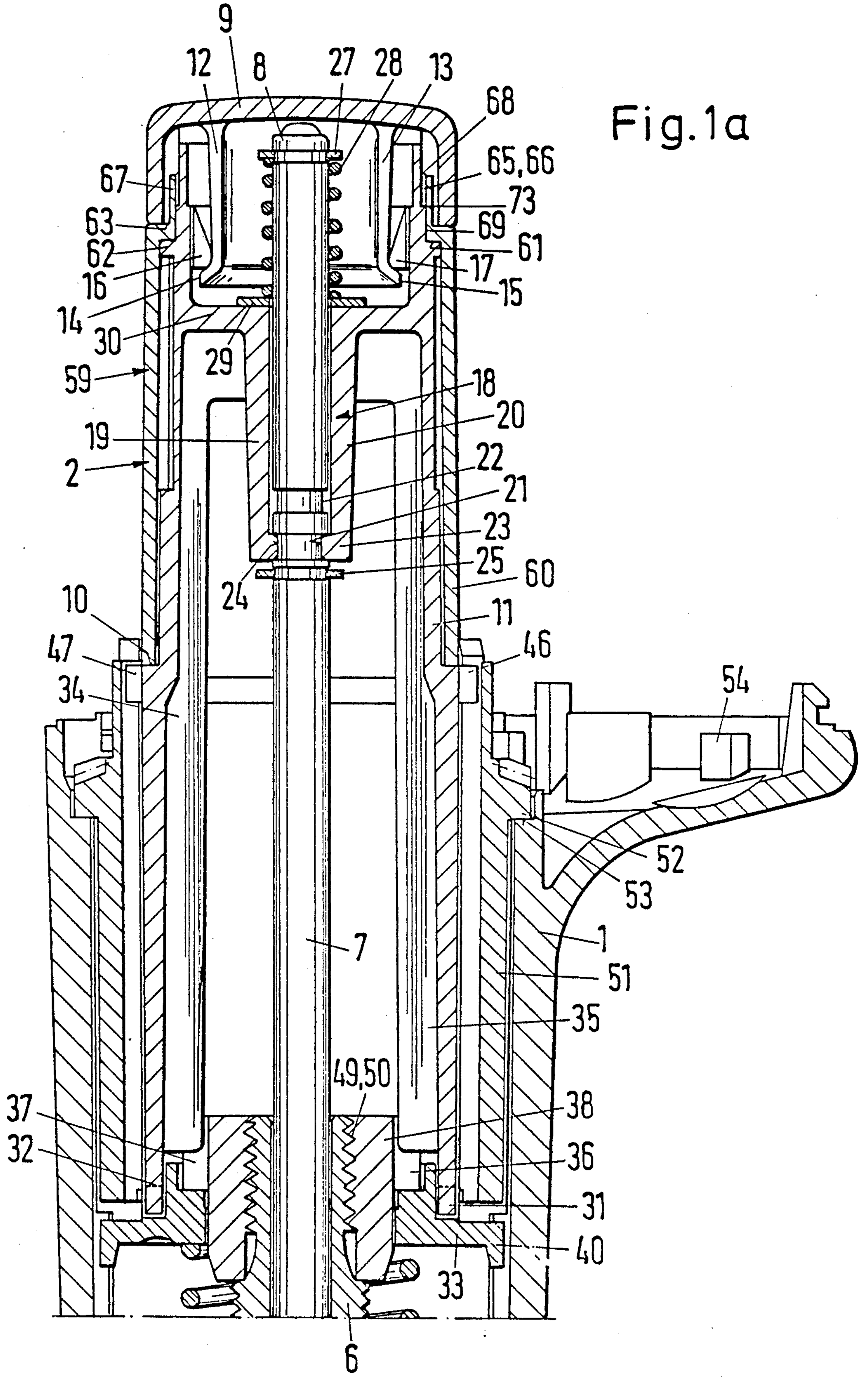
FIGS. 1*a* and 1*b* will be referred to hereinafter as FIG. 1.
Figure 1B:
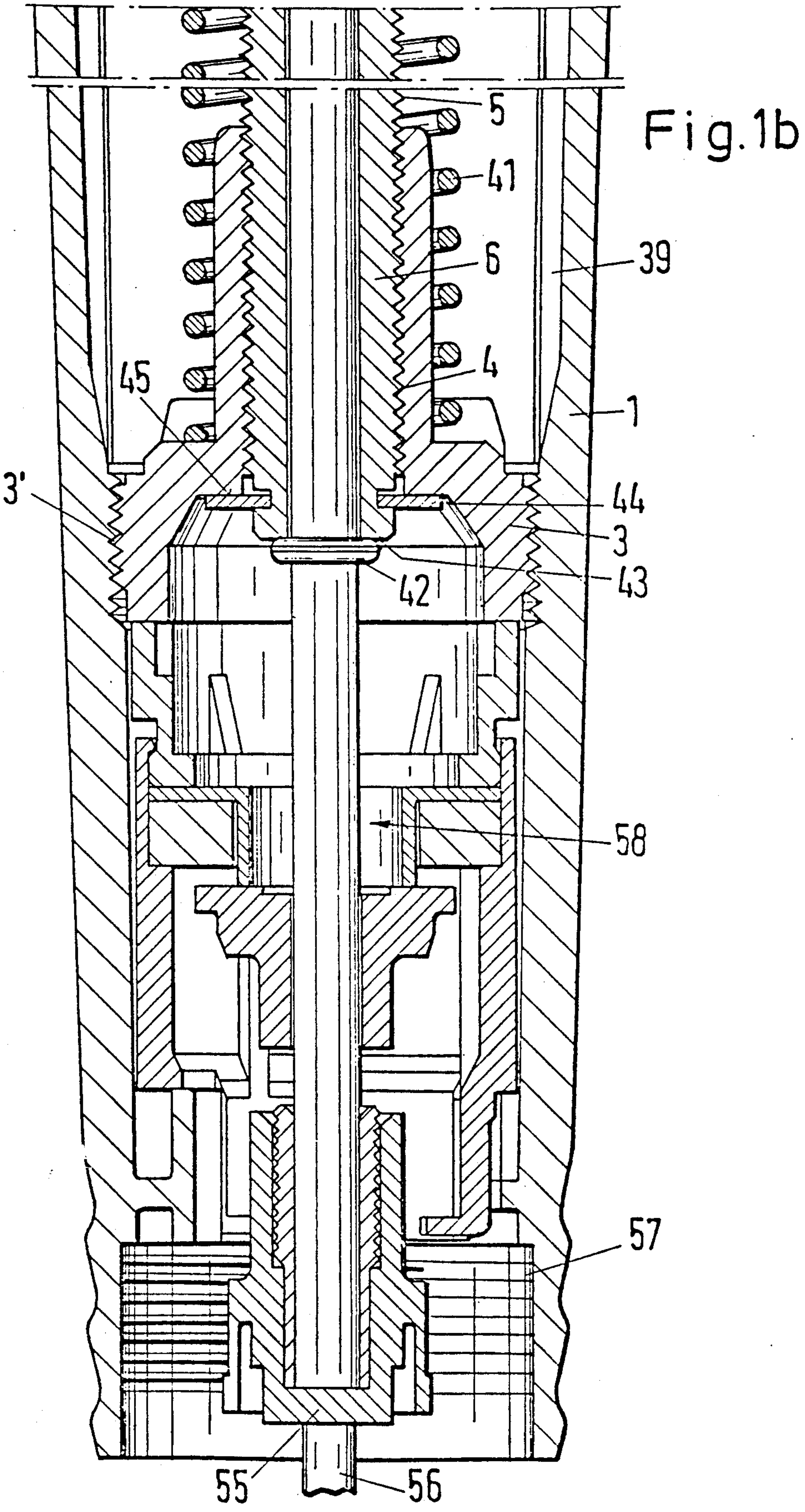

FIG. 1 shows only a part of the pipetting device. The housing 1 is represented only by its top portion, from which a rotatable and depressible actuating knob 2 protrudes upwardly.

From the above-mentioned U.S. Pat. No. 4,041,764 it is known that an actuating knob can be used to rotate a piston rod for an adjustment of a pipettable volume that is determined by peripherally spaced apart stops, which permit an adjustment only in steps.

To permit a substantially infinite adjustment, a nut 3 is fixed in the housing 1 and is provided with external screw threads 3' by which the nut 3 is axially and peripherally fixed in the housing 1, that is formed with corresponding internal screw threads. A screw 6 is provided with external screw threads 5, which have been screwed into internal screw threads 4, of the nut 3. A piston rod 7 extends axially through and is rotatably mounted in the tubular screw 6 and has a top end 8 which extends into and engages the cover cap 9 of the actuating knob 2, which has a depending shell 10.

Figure 2:
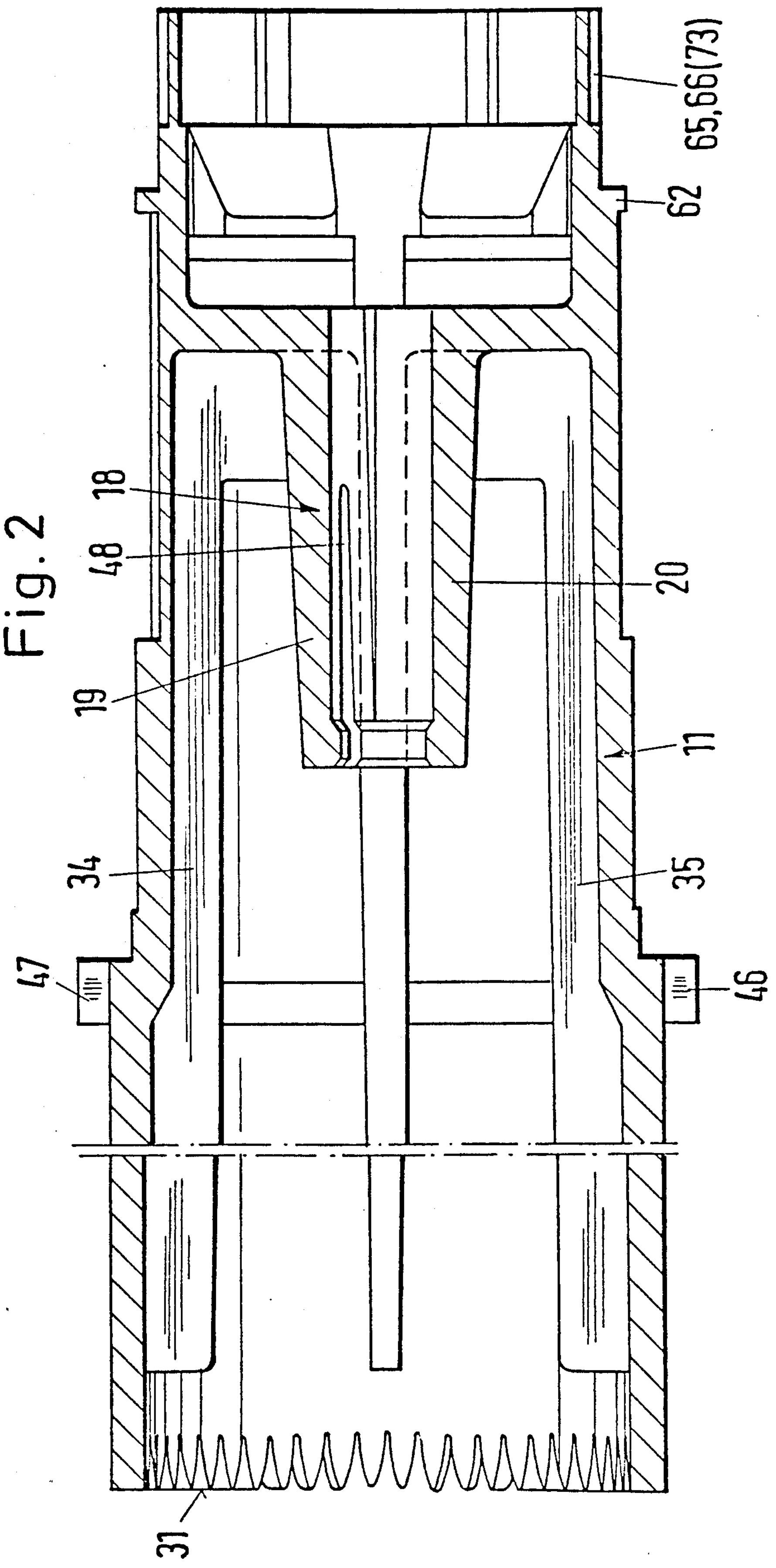
FIG. 2 is a fragmentary vertical longitudinal sectional view taken on line II—II in FIG. 3 and showing a detail of FIG. 1 on a larger scale.

That shell 10 of the actuating knob 2 is supported on a knob carrier 11, which is more clearly apparent from FIG. 2. The actuating knob 2 is axially coupled to the knob carrier 11 by spreadable spring elements 12, 13, which are provided on the cover cap and have outwardly extending locking portions 14, 15, which cooperate with abutments 16, 17 on the knob carrier 11 to hold the members 9 and 11 together.

The knob carrier 11 is tubular and in its interior is provided with a guide 18, which consists of spring arms 19, 20, which are separated by longitudinal slots 48, as is apparent from FIG. 2. The piston rod 7 extends through said guide and is formed with two vertically spaced apart peripheral annular grooves, which reveive inwardly directed locking shoes 23, 24 provided at the bottom ends of the spring arms 19, 20. It is apparent that this arrangement permits the piston rod to be rotated relative to the actuating knob 2 in two axially spaced apart positions.

A stop disk 25 is mounted on the piston rod 7 and is engageable with the bottom end of each of the spring arms 19; 20 etc. or with the locking shoes 23, 24 provided at said bottom ends. By that engagement, the upward movement of the piston rod 7 relative to the knob 2 is limited and piston rod 7 is caused to be depressed in unison with the actuating knob 2.

Slightly below the top end of the piston rod 7, the latter is provided with an abutment 27 for a compression spring 28, which at its other end bears via a washer 29 on a partition 30 of the knob carrier 11 so that the knob 2 and the knob carrier 11 are elastically coupled in that the spring elements 12, 13 which have been inserted are urged into engagement with the abutments 16, 17. The cover cap 9 of the knob 2 can be extracted together with the knob carrier 11 so that the locking shoes 24 will then be moved out of the peripheral groove 21 and can snap into the peripheral groove 22 when a stop 42 provided on the piston rod 7 engages the bottom end of the screw 6.

When this operation has been performed and the knob 2 is then rotated, the knob carrier 11 will be moved by a torque-limiting coupling 73, which may consist of a friction coupling and is provided to permit a further rotation even when gears which constitute a detent element joint mesh with each other without a risk that very fine teeth may be destroyed. That torque-limiting coupling generally designated 73 will be described more in detail hereinafter. Whereas such coupling may be provided in desirable embodiments, a rigid connection may also be adopted.

Figure 4:
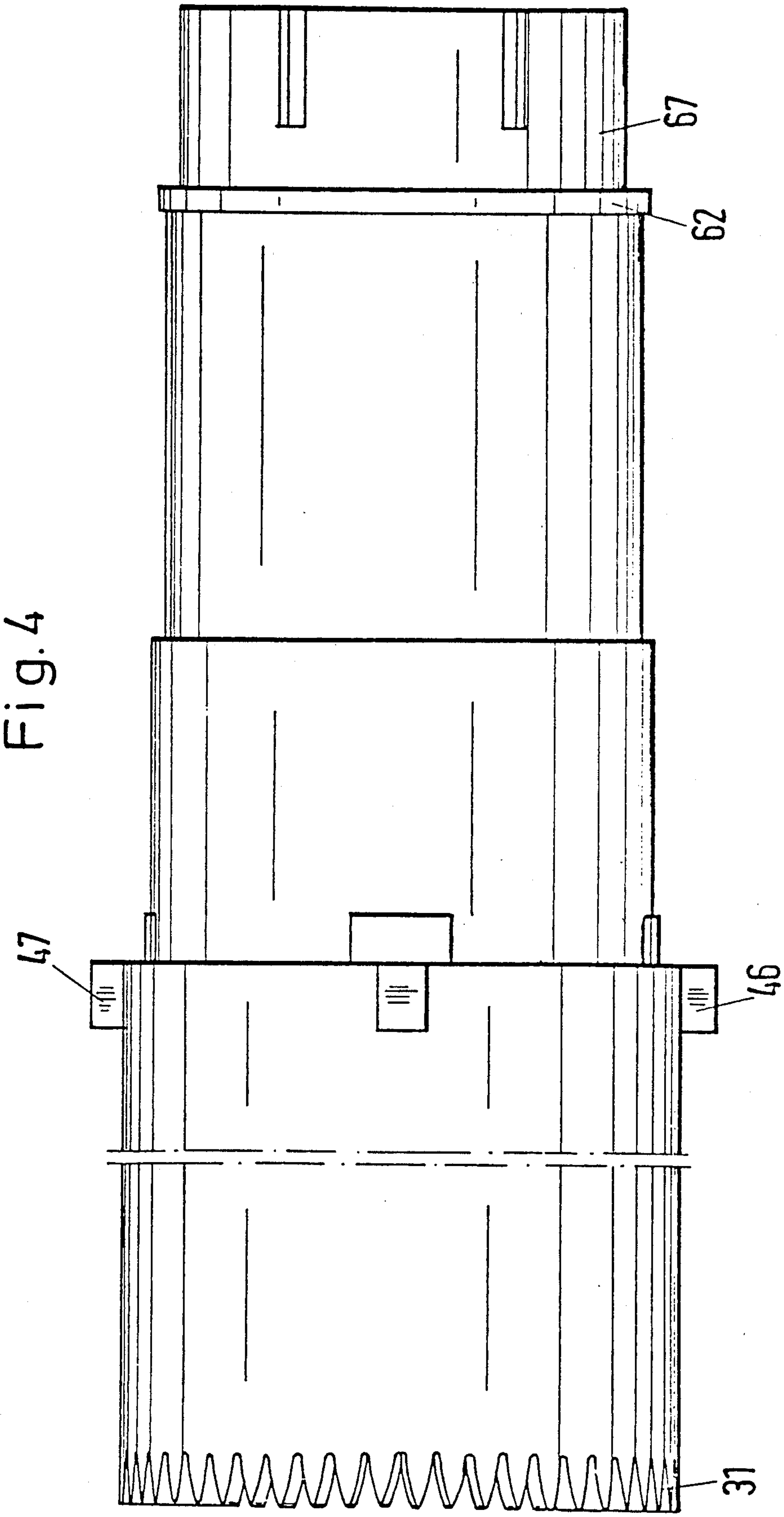
FIG. 4 is a side elevation showing the detail of FIG. 2.
Figure 5:
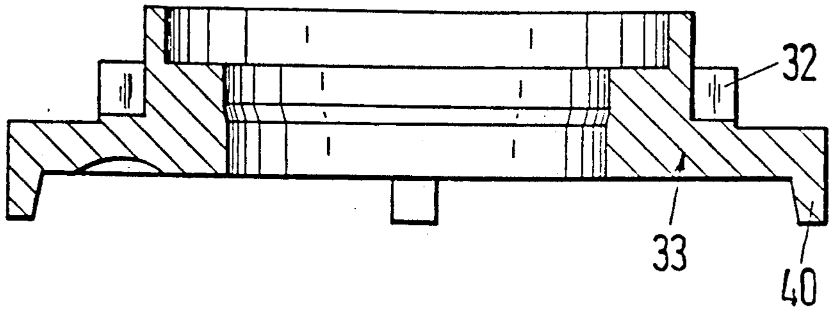
FIG. 5 is a fragmentary vertical longitudinal sectional view showing a detail of FIG. 1 on a larger scale.
Figure 6:
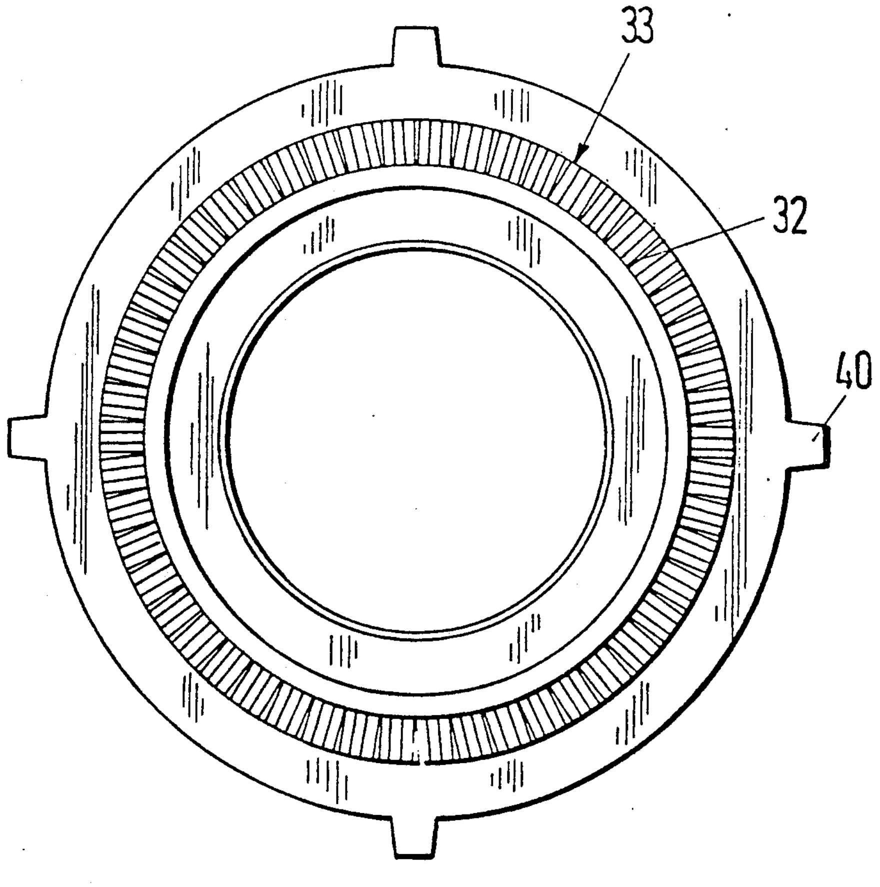
FIG. 6 is a top plan view showing the detail of FIG. 5.

During that extracting movement a gear 31 having depending teeth (see also FIGS. 2 and 4) is lifted out of a gear 32 provided on a detent disk 33, which is mounted in the housing 1 (FIGS. 5 and 6). At the same time, radially inwardly extending ribs 34, 35 remain in radially inwardly extending grooves 36, 37 formed in a coupling element 38, which is shown more in detail in FIG. 7 and is provided with internal screw threads 49, which have been screwed on external screw threads 50 on the top end portion of the screw 6 so that the coupling element 38 is non-rotatably connected to the screw 6 and the engagement of the ribs 34, 35 in the inwardly directed grooves 36, 37 of the coupling member will ensure that the screw 6 will rotate in unison with the knob 2 when the torque-limiting coupling 34, 35, 36, 37 is engaged.

The inwardly directed grooves 36, 37 have a larger axial extent than the teeth of the gears 31 and 32 so that the knob 2 and the screw will be non-rotatably connected even when the gears 31 and 32 are not in mesh.

When the knob 2 is upwardly extracted, a resistance must forcibly be overcome to move the ribs 34, 35 out of the grooves 36, 37 because the locking shoes 23, 24 of the knob carrier 11 extend into the peripheral groove 22 so that a resistance is presented which must be overcome before the knob 2 can entirely be extracted to take the device apart. Extensions 46, 47, which will be described hereinafter cooperate with the protruding portion to limit the upward movement. That protruding portion may cover a counter. That interlock must also be eliminated before the device can be taken apart. But that feature is no part of the present invention.

The detent disk 33 is axially displaceable relative to the coupling element 38 and is provided with projections 40, which extend into axial grooves 39 of the housing 1 so that the detent disk 33 can be depressed in the housing 1. A compression spring 41 is disposed between the insert 3 and the detent disk 33 and tends to raise the detent disk 33 so as to hold the gears 31, 32 in mesh with each other. In that arrangement the detent disk 33 is non-rotatably connected to the housing 1 but can axially be moved relative to the housing to such an extent that the depending arms of the angled projections 40 remain in the grooves 39 even when the knob 2 is pulled out until the stop disk 25 engages the bottom ends of the locking shoes 23, 24.

Figure 3:
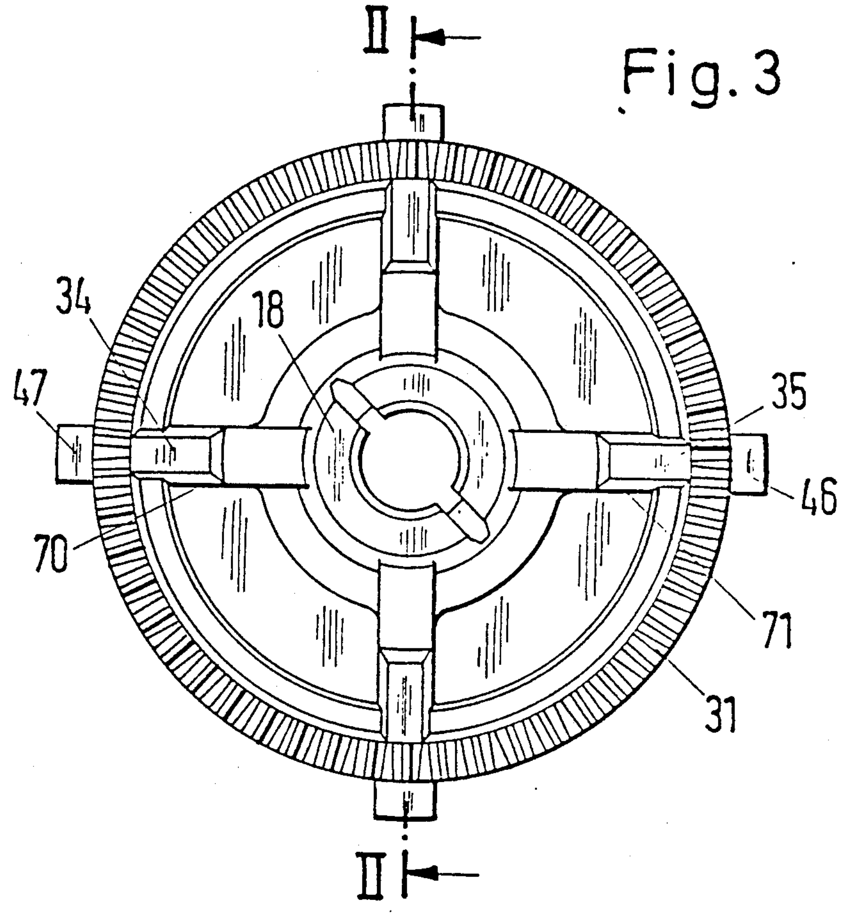
FIG. 3 is a bottom plan view of the detail shown in FIG. 2.

FIG. 3 shows the gear 31 and the extensions 46, 47 as well as the inwardly directed ribs 34, 35. It is apparent from FIG. 3, that corresponding parts are spaced 90° apart and that the ribs 70, 71 extend into inwardly directed grooves of the coupling element 38.

Figure 7:
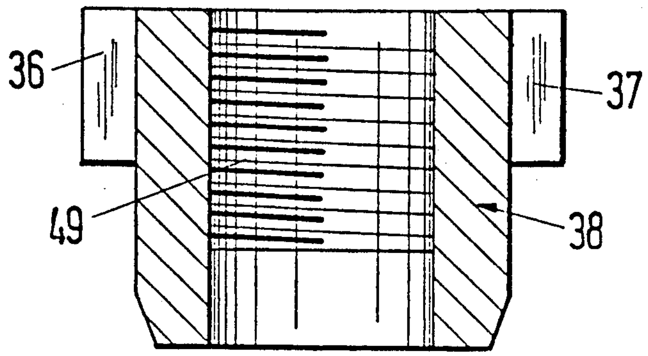
FIG. 7 is a vertical longitudinal sectional view showing a coupling element in the housing of the pipette.

That coupling element is shown in side elevation in FIG. 7. It has the peripheral configuration which is apparent from FIG. 3 and serves to stabilize the assembly.

An upward extraction of the knob 2 will disengage the gears 31, 32 from each other and the knob 2 can then be rotated. Owing to the interengagement between the elements 34, 35 and 36, 37 the rotation of the knob 2 will be transmitted to the screw 6, which is thus axially moved relative to the nut 3 and the axial movement of the screw 6 will be transmitted to the piston rod 7 because a stop 42 on the piston rod 7 is urged against the bottom rim 43 of the screw 6 by the action of the springs 41 and 28. The vertical movement of the screw and of the associated parts is limited in that an annular stop disk 44 engages the bottom surface 45 of the nut 3. As a result, the screw 6 cannot perform an unlimited upward movement toward the knob 2 but can only move downwardly to disengage the bottom surface of the nut 3.

If the resulting position shown in FIG. 1 is regarded as the initial position, the knob 2 can be upwardly extracted until the locking shoes 23, 24 snap into the upper peripheral groove. During that movement the outwardly directed extensions 46, 47 are raised in grooves of an insert 51, which has an outwardly protruding extension that constitutes a shoulder 52, which is supported and retained on a step 53 of the housing 1 by an element 54, which is provided at the top of the housing and is not shown in FIG. 1.

The piston rod 7 is non-rotatably connected to a member 55, from which an extension of the piston rod or the piston protrudes. As is disclosed in the above-mentioned U.S. Pat. No. 4,041,764 the piston 56 is provided with extensions, which protrude into the conical pipette connector or into a passage by which said connector is continued. The piston 56 is operable to move an air volume so as to suck or discharge liquid into or out of the pipette.

Owing to the internal screw threads 57 of the housing, additional housing parts may be connected. Special retaining means may be provided in the region 58 and in accordance with U.S. Pat. No. 4,041,764 may consist of retaining means which can be overcome and may consist, e.g., of a solenoid assembly having separable parts. By means of such solenoid assembly, a desired setting may infinitely be selected.

Owing to that arrangement the piston rod 7 can be moved down from the bottom rim 43 of the screw 6 but cannot be raised. If the device has been adjusted in the illustrated initial position to have the largest possible pipettable volume and is to be adjusted to have a smaller pipettable volume, the knob 2 may be upwardly extracted until the locking shoes 23, 24 enter the peripheral groove 22 so that the gears 31, 32 are disengaged from each other and the knob 2 can then be rotated to rotate also the screw 6, which will thus be lowered in unison with the piston rod 7. After a sufficient rotation the knob 2 is depressed until the locking shoes 23, 24 enter the peripheral groove 21.

Figure 9:
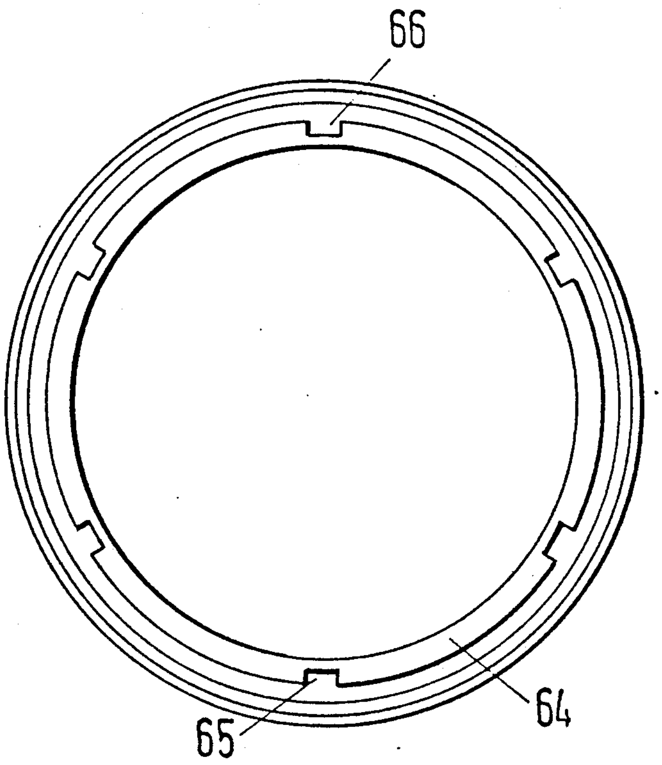
FIG. 9 is a top plan view showing the knob connector of FIG. 8.
Figure 8:
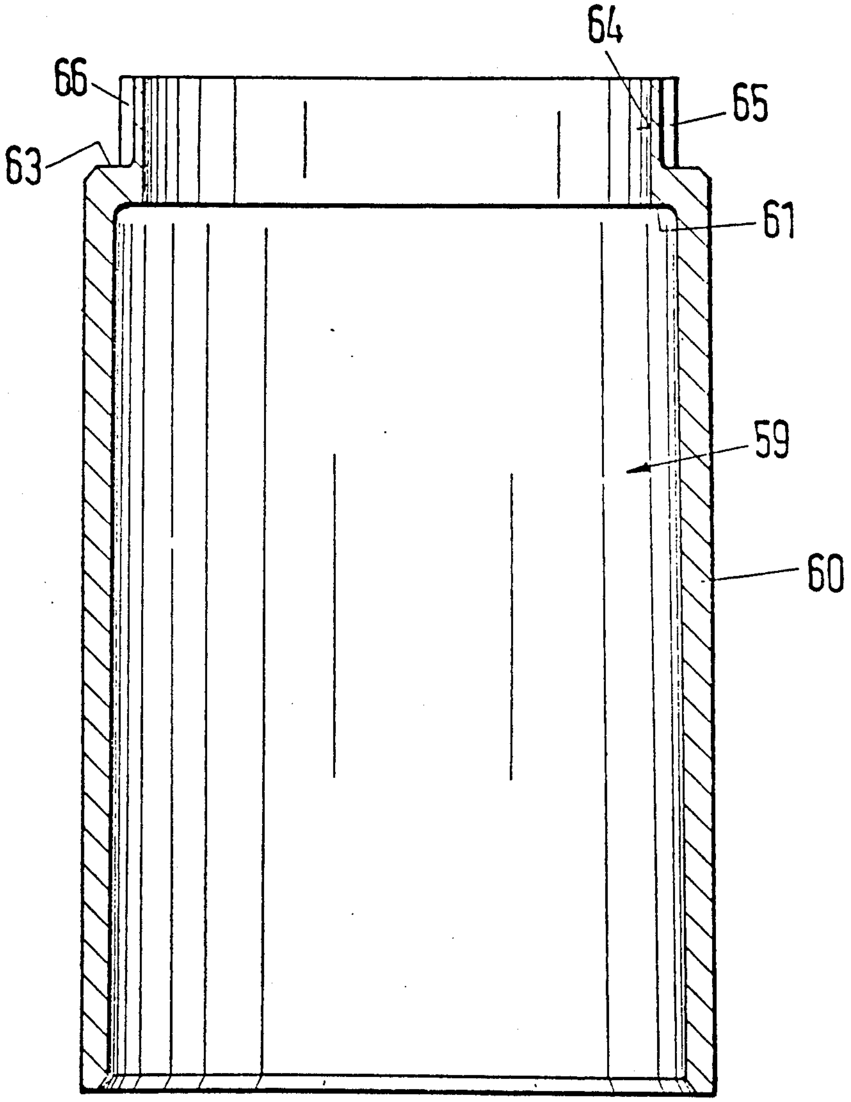
FIG. 8 is a vertical longitudinal sectional view showing a knob connector.

If the screw 6 is rotated to such an extent that its vertical movement exceeds the limit that is defined by the annular disk 44, the above-mentioned torque-limiting coupling 73 will become effective. That coupling is constituted by a knob connector 59, which is provided between the knob carrier 11, which is shown also in FIGS. 2 and 4, and the cover cap 9. That knob connector 59 is shown in a longitudinal vertical sectional view in FIG. 8 and in top plan view in FIG. 9.

In the sectional view, an outer cylinder 60 is apparent, which is shown also in FIG. 1 and which may be transparent. The cylinder 60 is provided at its top with an inwardly extending step 61, which rests on the upwardly extending flange 62 of the knob carrier 11. Under the action of the spring elements 12, 13 the cover cap 9 is retained on the outwardly extending top step 63.

On the inside of the top step 63 the knob connector 59 is provided with an upwardly protruding, elastic cylindrical extension 64 (FIG. 9), which is formed with peripherally spaced apart indentations 65, 66.

The cover cap 9 is provided on its downwardly depending shell 10 with inwardly directed ribs 67, 68, which extend into said indentation 65, 66 so that the elements 9 and 59 are non-rotatably connected by a snap-action joint, which is adapted to be overcome. On the other hand, the knob connector 59 is connected at 69 to the knob carrier 11 by a friction joint. Owing to that arrangement, the above-mentioned torque-limiting coupling is provided, which is generally designated 73 and consists of the above-described snap-action joint formed by the indentations 65, 66 cooperating with the ribs 67, 68 and of the friction joint 69. The cover cap 9 is thus connected to the knob carrier 11 by the snap-action joint, which can be overcome, and by the friction joint.

The top portion of FIG. 1 shows on the right and left different designs of the means connecting the inner knob carrier and the outer knob connector 59 because a joint comprising grooves and ribs may also be provided there.

Means are provided to protect a stop disk 25 provided on the piston rod 7 from being overloaded by the torque-limiting coupling 73. That coupling 73 desirably comprises an elastic coupling member 64, which has recesses, which receive mating elastic elements 67, 68 of a second coupling member. One coupling member is constituted by the knob carrier 11, which is connected to one gear 32 of the detent element joint. The other coupling member is provided on the rotatable actuating knob 2.

A knob carrier 11 which is non-rotatably and axially guided in the housing is desirably provided with axially extending, tonguelike spring elements 19, 20, which are provided with locking shoes 24, 25, which extend into either of two axially spaced apart annular grooves 21, 22 of the piston rod 7 in dependence on the extent to which the knob 2 has been extracted.

If the actuating knob 2 consists of two parts, said two parts will be non-rotatably connected to each other and the top part will be elastically fitted on the upwardly protruding piston rod 7 by means of elastically spreadable spring elements 12, 13, which engage abutments 16, 17 of the knob carrier 11 from below.

The axially movable detent disk which is guided in the housing 1 is biased upwardly by spring pressure against an abutment constituted by the bottom rim of the insert 51 in the housing.

Figure 10:
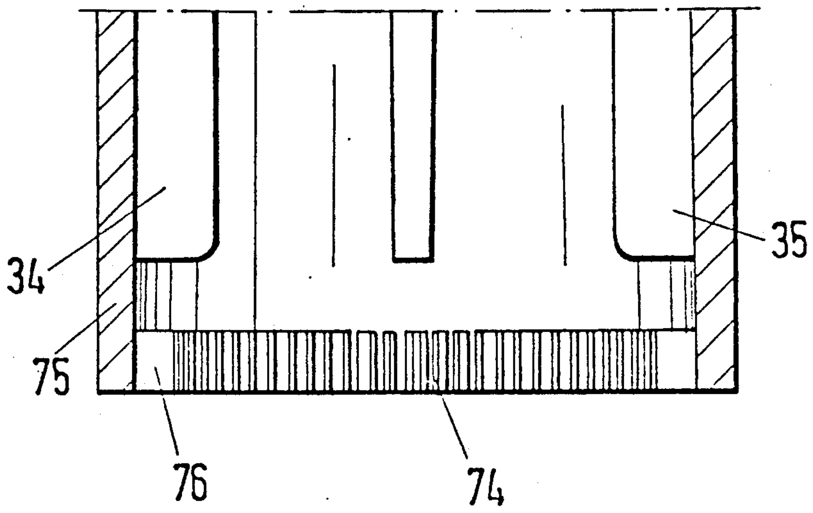
FIG. 10 is a sectional view showing a different embodiment in which a gear having radially outwardly extending teeth is fixed to the housing and is in mesh with radially inwardly extending teeth of a gear which is provided on the cylindrical shell of the knob carrier.

FIG. 10 shows a different embodiment of the lower portion of the component that is illustrated in FIG. 4. That lower portion extends as far as to the lower opening 74. Inwardly extending teeth 76 are provided at the rim of the opening 74 inside the wall 75 of the knob carrier 11 and are engageable with the gear 32, which in that case has exactly mating radial teeth so that said teeth may have a particularly fine pitch.

Figure 12:
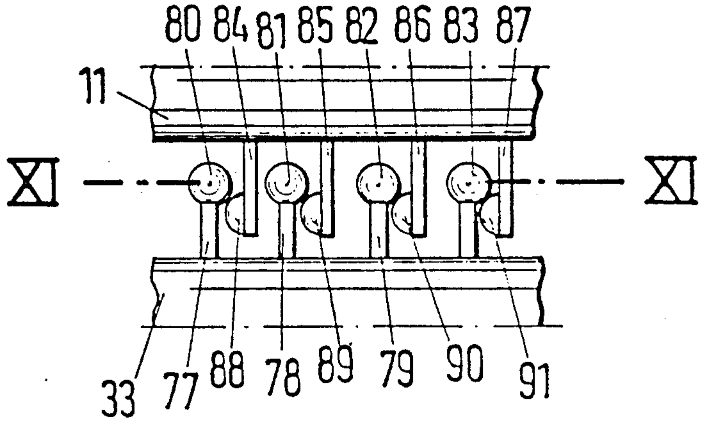
FIG. 12 is a fragmentary side elevation showing a portion of said gears.
Figure 11:
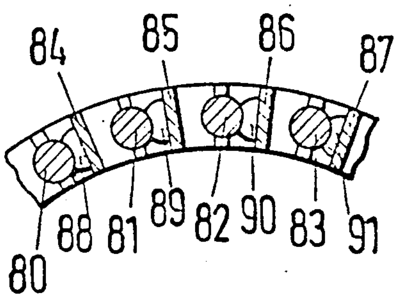
FIG. 11 is a top plan view showing gears provided with elastic teeth.

The embodiment shown in FIGS. 11 and 12 comprises particularly designed, meshing gears 31 and 32. The gear 31 is provided at the bottom rim of the knob carrier 11. The other gear 32 is provided on the nut 3 or on the detent disk 33.

Figure 13:
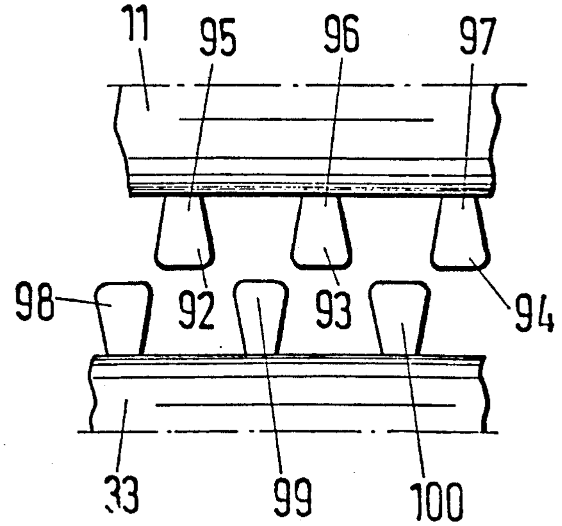
FIG. 13 is a fragmentary side elevation showing different gears having teeth provided with conical enlarged portions.

Each of FIGS. 12 and 13 shows a portion of the detent disk 33 which is provided with a gear having specially designed, upwardly directed teeth, and show also the depending teeth provided on the knob carrier 11. Only a portion of the knob carrier 11 is shown.

For instance, it is apparent from FIG. 12 that each of the teeth 77, 78, 79 . . . of the gear 32 is provided at its top end with a ball-like enlarged portion 80, 81; 82, 83 and the teeth 84 to 87 of the gear 31 are provided, e.g., only on one side, with a beadlike enlarged portion 88 to 91.

Because the beadlike enlarged portions 88 to 91 are provided only on one side of the respective teeth, it is possible to provide the gear 31 with elastic teeth 84 to 87 consisting, e.g., of blades, which can yield laterally so that the enlarged portions 80 to 83 and 88 to 91 can move past each other and a snap-action joint can thus be formed.

The meshing of said gears is shown in FIG. 11 in a horizontal sectional view taken on line XI—XI in FIG. 12. The depending teeth 84 to 87 provided with the unilateral enlarged portions 88 to 91 are apparent as well as the lower teeth 77 to 79 provided with the ball-shaped enlarged portions 80 to 83.

FIG. 13 is a view that is similar to FIG. 12. The teeth 92, 93, 94 of the gear 31 are conical and are so arranged that they can elastically yield at their roots 95 to 97. The teeth 98 to 100 of the other gear 32 provided on the detent disk 33 are similarly designed. The spacing or pitch of the gears is so selected that a lateral yielding movement will be possible during a snap action taking place as the gears are moved into or out of meshing engagement with each other.

In order to permit a small tooth pitch, the enlarged portions which flare to the crest of the tooth may be provided only on one side, as is shown at 88 to 91, and may be so arranged that two of such enlarged portions will be provided on those sides of the gears 31 and 32 which face each other, whereas the teeth are flat on the other side.

In the embodiment shown in FIG. 13 the crest of each tooth has rounded edges so that the crests will yield as the gears are axially moved into and out of meshing engagement with each other.

Similar enlarged portions may be provided on the teeth of the gears shown in FIG. 10.

In the embodiments shown in FIGS. 11 to 13 the pitch circles of the two gears 31, 32 are axially aligned and equal in diameter. In order to permit the use of gears having a very small tooth pitch, the two gears may alternatively have pitch circles which have radii which are so slightly different that the gears can still mesh with each other. In that case the enlarged portions provided on the teeth of the two gears may overlap and the teeth may be elastically yieldable, particularly also in a radial direction, so that the gears will be movable into meshing engagement by a snap action.

Whereas embodiments have been shown which comprise protruding enlarged portions, a snap action may also be achieved if the teeth of one gear are provided with an enlarged portion and the teeth of the other gear are formed with mating recesses, which are adapted to receive said enlarged portions so that a smaller force will be sufficient to effect a snap-action engagement.

In case of a radial engagement such as is illustrated in FIG. 10 the teeth may consist of pins, which by a snap action can enter mating recesses formed in the other gear.

If gears having axially extending teeth are provided, said gears may be connected by elements of snap fasteners, which consist of male elements provided on one of said gears and having an enlarged head and of recesses or holes formed in the other of said gears and having a constricted mouth adjacent to said male elements and provided in said mouth with an elastic rim which is constituted by spring elements.

At least adjacent to the meshing gears the pipetting device may be enlarged in width so that a sufficiently fine adjustment will be permitted by the said enlarged portion with gears having a given peripheral tooth pitch.

I claim:

1. A pipetting device comprising:

a housing having a top end, an actuating element, which protrudes from said top end and is depressible against spring action, a piston, which is axially connected to the actuating element, a cylinder, which is disposed in said housing and contains said piston, which is movable in said cylinder to move an air volume, a tubular pipette connector, which is adapted to be slidably fitted into a pipette tip, which connector and tip are open at both ends, means which connect said cylinder and said pipette connector and establish a fluid communication between the interior of said cylinder and the interior of said pipette connector, means by which said actuating element is rotatably mounted in said housing, and means for controlling said air volume in dependence on the angular position of said actuating element relative to said housing, which pipette device is improved in that said actuating element is rotatably mounted in said housing by means of a nut (3), which is fixed to said housing, and of a screw (6), which is non-rotatably coupled to said actuating element and is screwed into and extends through said nut and is axially coupled to said piston, said actuating element (2) and said housing (1) being non-rotatably connected by an axially separable detent element joint (31, 32), said actuating element (2) being axially movable to establish and to eliminate said joint, said piston (56) being connected to a piston rod (7), said screw (6) being rotatable and axially movable in said nut (3) when said detent element joint (31, 32) has been separated, and said actuating element (2) being non-rotatably coupled to said screw (6) by a coupling (34, 35, 36 37) which causes said screw (6) to be rotated by said actuating element (2) when said detent element joint (31, 32) has been separated.

2. A pipetting device according to claim 1, wherein said pipette connector is conical.

3. A pipetting device according to claim 1, wherein said actuating element (2) is non-rotatably coupled to said housing (1) by a torque-limiting coupling (73), which permits said screw (6) to be rotated by said actuating element (2) when said detent element joint (31, 32) is effective.

4. A pipetting device according to claim 1, wherein said actuating element comprises a knob (2), a knob carrier (11) is provided, which is axially movably mounted in and non-rotatably connected to said housing (1) and is axially coupled to said knob (2), said detent element joint comprises a first gear (32), which is non-rotatably connected to said housing (1), and a second gear (31), which is non-rotatably connected to said knob carrier (11) and is axially movable by said knob carrier into and out of meshing engagement with said first gear (32).

5. A pipetting device according to claim 4, wherein said first gear (32) has upwardly extending teeth (77–79; 98–100) meshing with said second gear (31) and said second gear (31) is disposed above said first gear (32).

6. A pipetting device according to claim 4, wherein said second gear (31) has radially inwardly extending teeth (76) meshing with said first gear (32).

7. A pipetting device according to claim 4, wherein at least one of said gears (31, 32) has resiliently yieldable teeth (84–87; 77–79; 92–94; 98–100) which mesh with the other of said gears and permit said gears to be rotated relative to each other even when said gears are in meshing engagement and the teeth of at least one of said gears are shaped to maintain said gears in meshing engagement even during a rotation of said gears relative to each other.

8. A pipetting device as set forth in claim 7, wherein the teeth of both of said gears (31, 32) consist of elastic blades, which are provided at their tips with enlarged portions (80–83; 88–91), which yieldably oppose an axial movement of said gears (31, 32) relative to each other.

9. A pipetting device according to claim 8, wherein said enlarged portions (80–83; 88–91) consist of spherical beads.

10. A pipetting device according to claim 8, wherein said enlarged portions are conical and taper in mutually opposite directions relative to said gears (FIG. 13).

11. A pipetting device according to claim 8, wherein said teeth (84–87; 77–79; 92–94; 98–100) consist of laterally yieldable blades and said teeth on at least one of said gears (31, 32) are provided with said enlarged portions (80–83; 88–91) only on one side.

12. A pipetting device according to claim 1, wherein a piston rod (7) which is axially coupled to said piston (56) extends between said piston (56) and a top end of said actuating element (2), and said piston rod (7) carries a stop (42), which cooperates with said screw (6) to define for said piston rod (6) an uppermost position relative to said screw (6) and in said actuating element (2).

13. A pipetting device according to claim 1, wherein said actuating element comprises a knob (2), which protrudes from the top end of said housing (1), a knob carrier (11) is non-rotatably and axially displaceably mounted in said housing (1) and is axially coupled to said knob (2), and a torque-limiting coupling (73) is provided, by which said knob (2) is non-rotatably connected to said knob carrier (11).

14. A pipetting device according to claim 13, wherein said torque-limiting coupling (73) comprises first and second coupling members (64, 11), said first coupling member (64) is elastic and formed with peripherally spaced apart recesses (65, 66) and said second coupling member (11) comprises elastic coupling means (67, 68) interengaging with said recesses (65, 66), one of said coupling members (64) is provided on said knob and the other of said coupling members is constituted by said knob carrier (11).

15. A pipetting device according to claim 13, wherein said knob carrier (11) is provided with axially extending, tonguelike spring elements (19, 20), which have radially inner ends provided with locking shoes (24, 25) and said piston rod (7) extends into said knob carrier (11) and is provided with axially spaced apart annular grooves (21, 22), which are adapted to receive said locking shoes (24, 25) in respective axial positions of said knob carrier (11) and said piston rod (7) relative to each other.

16. A pipetting device according to claim 1, wherein said actuating element comprises a knob (2), which protrudes from the top end of said housing (1) and comprises top and bottom parts, which are nonrotatably connected to each other, said knob (2) is carried by a knob carrier (11), which is mounted in said housing and provided with abutments and said top part comprises an elastic insert, which has outwardly spreadable elastic spring elements (12, 13), a piston rod (7) is axially coupled to and extends from said piston (56) into frictional engagement with said spring elements (12, 13) and said spring elements (12, 13) extend below and are axially engageable with said abutments (16, 17).

17. The improvement set forth in claim 16, wherein said knob (2) and said knob carrier (11) are connected by a knob connector (59), said knob (2) comprises a cover cap (9) having a depending shell (10) and said cover cap (9) is non-rotatably connected to said knob connector (59) by a torque-limiting coupling (73).

18. A pipetting device according to claim 17, wherein said knob connector (59) is provided at its top with a cylindrical extension (64) extending into said shell (10) and said torque-limiting coupling (73) comprises peripherally spaced apart recesses (65, 66) formed on the outside peripheral surface of said extension (64) and of radially inwardly extending, resiliently yieldable ribs (67, 68) which are provided on the inside surface of said shell (10) and extend into said recesses (65, 66), said recesses (65, 66), on the one hand, and said ribs (67, 68), on the other hand, have different pitch circles, and said cylindrical extension (64) is formed in said recesses (65, 66) and said shell (10) is formed on said ribs (67, 68) with enlarged portions, which face and overlap each other.

19. A pipetting device according to claim 18, wherein said ribs (67, 68) are elastically yieldable in a radial direction.

* * * * *